United States Patent
Mishra et al.

(10) Patent No.: US 12,032,932 B2
(45) Date of Patent: Jul. 9, 2024

(54) COMPILER-BASED GENERATION OF TRANSACTION ACCURATE MODELS FROM HIGH-LEVEL LANGUAGES

(71) Applicant: Xilinx, Inc., San Jose, CA (US)

(72) Inventors: Shantanu Mishra, Hyderabad (IN);
Hemant Kashyap, Hyderabad (IN);
Uday Kyatham, Hyderabad (IN);
Mahesh Attarde, Hyderabad (IN);
Amit Kasat Kasat, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 18 days.

(21) Appl. No.: 17/811,660

(22) Filed: Jul. 11, 2022

(65) Prior Publication Data
US 2024/0012629 A1    Jan. 11, 2024

(51) Int. Cl.
*G06F 8/41* (2018.01)

(52) U.S. Cl.
CPC .............. *G06F 8/434* (2013.01); *G06F 8/44* (2013.01)

(58) Field of Classification Search
None
See application file for complete search history.

(56) References Cited

U.S. PATENT DOCUMENTS

| | | | |
|---|---|---|---|
| 6,467,075 B1 * | 10/2002 | Sato ................. | G06F 30/30 716/132 |
| 7,162,401 B1 * | 1/2007 | Abeles .................... | G06F 30/33 703/13 |
| 7,197,445 B1 | 3/2007 | Deepak et al. | |
| 7,302,377 B1 | 11/2007 | Deepak | |
| 7,330,808 B1 | 2/2008 | Jorgensen et al. | |
| 7,370,311 B1 * | 5/2008 | Pritchard .............. | G06F 30/327 703/16 |
| 7,409,670 B1 * | 8/2008 | Pritchard .............. | G06F 30/327 711/100 |
| 7,451,417 B1 | 11/2008 | Campbell | |
| 7,590,137 B1 | 9/2009 | Chan | |
| 7,636,653 B1 | 12/2009 | Chan | |
| 7,673,201 B1 | 3/2010 | Chan | |
| 7,707,019 B1 | 4/2010 | Ballagh et al. | |
| 7,721,090 B1 | 5/2010 | Deepak et al. | |
| 7,739,092 B1 | 6/2010 | Ballagh et al. | |
| 7,895,026 B1 | 2/2011 | Kelly et al. | |

(Continued)

OTHER PUBLICATIONS

Ramanathan, Nadesh, George A. Constantinides, and John Wickerson. "Precise pointer analysis in high-level synthesis." 2020 30th International Conference on Field-Programmable Logic and Applications (FPL). IEEE, 2020. (Year: 2020).*

(Continued)

*Primary Examiner* — Matthew J Brophy
(74) *Attorney, Agent, or Firm* — Kevin T. Cuenot

(57) ABSTRACT

Compiling a high-level synthesis circuit design for simulation includes analyzing, using computer hardware, a kernel specified in a high-level language to detect pointers therein. A determination is made as to which of the pointers are global address space pointers referencing a global address space. The kernel is instrumented by replacing accesses in the kernel to the global address space with calls to wrapper functions for performing the accesses. A simulation kernel is generated that specifies an assembly language version of the kernel as instrumented.

20 Claims, 8 Drawing Sheets

(56) References Cited

U.S. PATENT DOCUMENTS

| | | | |
|---|---|---|---|
| 7,930,162 B1 | 4/2011 | Chan et al. | |
| 8,041,553 B1 | 10/2011 | Hernandez et al. | |
| 8,074,077 B1 | 12/2011 | Neema et al. | |
| 8,150,638 B1 | 4/2012 | Wu et al. | |
| 8,195,441 B1 | 6/2012 | Ou et al. | |
| 8,352,229 B1 | 1/2013 | Ma et al. | |
| 8,769,448 B1 | 7/2014 | Sundararajan et al. | |
| 9,015,649 B2* | 4/2015 | Mehta | G06F 30/33 717/136 |
| 9,058,192 B2* | 6/2015 | Gaster | G06F 11/3636 |
| 9,117,043 B1 | 8/2015 | Huang et al. | |
| 9,223,910 B1 | 12/2015 | Ghosh et al. | |
| 9,424,009 B2* | 8/2016 | Gaster | G06F 8/24 |
| 9,552,448 B2* | 1/2017 | Mehta | G06F 30/33 |
| 9,612,863 B2* | 4/2017 | Ventroux | G06F 30/20 |
| 9,811,618 B1 | 11/2017 | Parekh et al. | |
| 10,180,826 B2* | 1/2019 | Raghavendra | G06F 8/4432 |
| 10,296,673 B1 | 5/2019 | Ghosh et al. | |
| 10,437,946 B1 | 10/2019 | Kasat et al. | |
| 10,437,949 B1 | 10/2019 | Mihalache et al. | |
| 10,671,785 B1 | 6/2020 | Mihalache et al. | |
| 2006/0282233 A1* | 12/2006 | Pasricha | G06F 30/33 703/1 |
| 2010/0122264 A1* | 5/2010 | Xiaocheng | G06F 12/1063 719/330 |
| 2012/0017197 A1* | 1/2012 | Mehta | G06F 30/33 717/106 |
| 2014/0047419 A1* | 2/2014 | Gaster | G06F 8/42 717/141 |
| 2014/0325516 A1* | 10/2014 | Ventroux | G06F 9/48 718/102 |
| 2015/0193568 A1* | 7/2015 | Mehta | G06F 30/367 716/138 |
| 2015/0261511 A1* | 9/2015 | Gaster | G06F 9/44 717/141 |
| 2015/0379172 A1* | 12/2015 | Ventroux | G06F 30/331 703/21 |
| 2017/0004232 A9* | 1/2017 | Ventroux | G06F 30/33 |
| 2017/0115970 A1* | 4/2017 | Raghavendra | G06F 8/433 |

OTHER PUBLICATIONS

Özkan, M. Akif, et al. "AnyHLS: High-level synthesis with partial evaluation." IEEE Transactions on Computer-Aided Design of Integrated Circuits and Systems 39.11 (2020): 3202-3214. (Year: 2020).*

* cited by examiner

COMPILER-BASED GENERATION OF TRANSACTION ACCURATE MODELS FROM HIGH-LEVEL LANGUAGES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to simulating a design for an electronic system and, more particularly, to generating transaction accurate models from a design for an electronic system expressed in a high-level language.

BACKGROUND

High-level synthesis (HLS) is a process by which a high-level language (HLL) specification is translated into a register transfer language (RTL) specification. HLLs are programming languages that have been historically used to create software programs that can be compiled into program code that is executable by a computer processor. The RTL specification generated from an HLL specification can be processed into implementation data, which can then be used to configure a programmable integrated circuit (IC) or fabricate an application-specific integrated circuit (ASIC). Thus, HLS supports creating a circuit from an HLL specification defining a circuit design. HLS can expedite the process of creating circuit designs and allows designers having a wider range of technical backgrounds to create circuit designs.

Simulation is an important part of the design flow for implementing a circuit from a circuit design. Simulating a circuit design allows one to verify the functionality of the circuit design as well as the expected performance of the circuit design. Simulation of an HLS circuit design, e.g., a circuit design initially specified as an HLL specification, may be performed by first converting the HLL specification into an RTL specification. An RTL simulator may then be used to simulate the generated RTL specification. The RTL simulator provides cycle accurate simulation results. RTL simulation, however, can require a significant amount of the designer's time as well as a significant amount of computer resources. The amount of time needed to run an RTL simulation may be exceedingly large.

In cases where simulation reveals design issues or errors, modifications to the HLL specification may be made. The revised HLL specification may be again converted into an RTL specification and simulated to check the functionality of the circuit design. Given the time required for RTL generation and the increased time required for simulating the RTL specification, performing these actions in an iterative manner may be even more time-consuming. Further complicating matters, the debugging process is difficult since the designer is unable to directly debug the original HLL specification.

SUMMARY

In one or more example implementations, a method includes analyzing, using computer hardware, a kernel specified in a high-level language to detect pointers therein. The method includes determining, using the computer hardware, which of the pointers are global address space pointers referencing a global address space. The method includes instrumenting, using the computer hardware, the kernel by replacing accesses in the kernel to the global address space with calls to wrapper functions for performing the accesses. The method includes generating a simulation kernel specifying an assembly language version of the kernel as instrumented.

In one or more example implementations, a system includes one or more processors configured to initiate operations. The operations include analyzing a kernel specified in a high-level language to detect pointers therein. The operations include determining which of the pointers are global address space pointers referencing a global address space. The operations include instrumenting the kernel by replacing accesses in the kernel to the global address space with calls to wrapper functions for performing the accesses. The operations include generating a simulation kernel specifying an assembly language version of the kernel as instrumented.

In one or more example implementations, a computer program product includes one or more computer-readable storage media, and program instructions collectively stored on the one or more computer-readable storage media. The program instructions are executable by computer hardware to initiate operations. The operations include analyzing a kernel specified in a high-level language to detect pointers therein. The operations include determining which of the pointers are global address space pointers referencing a global address space. The operations include instrumenting the kernel by replacing accesses in the kernel to the global address space with calls to wrapper functions for performing the accesses. The operations include generating a simulation kernel specifying an assembly language version of the kernel as instrumented.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
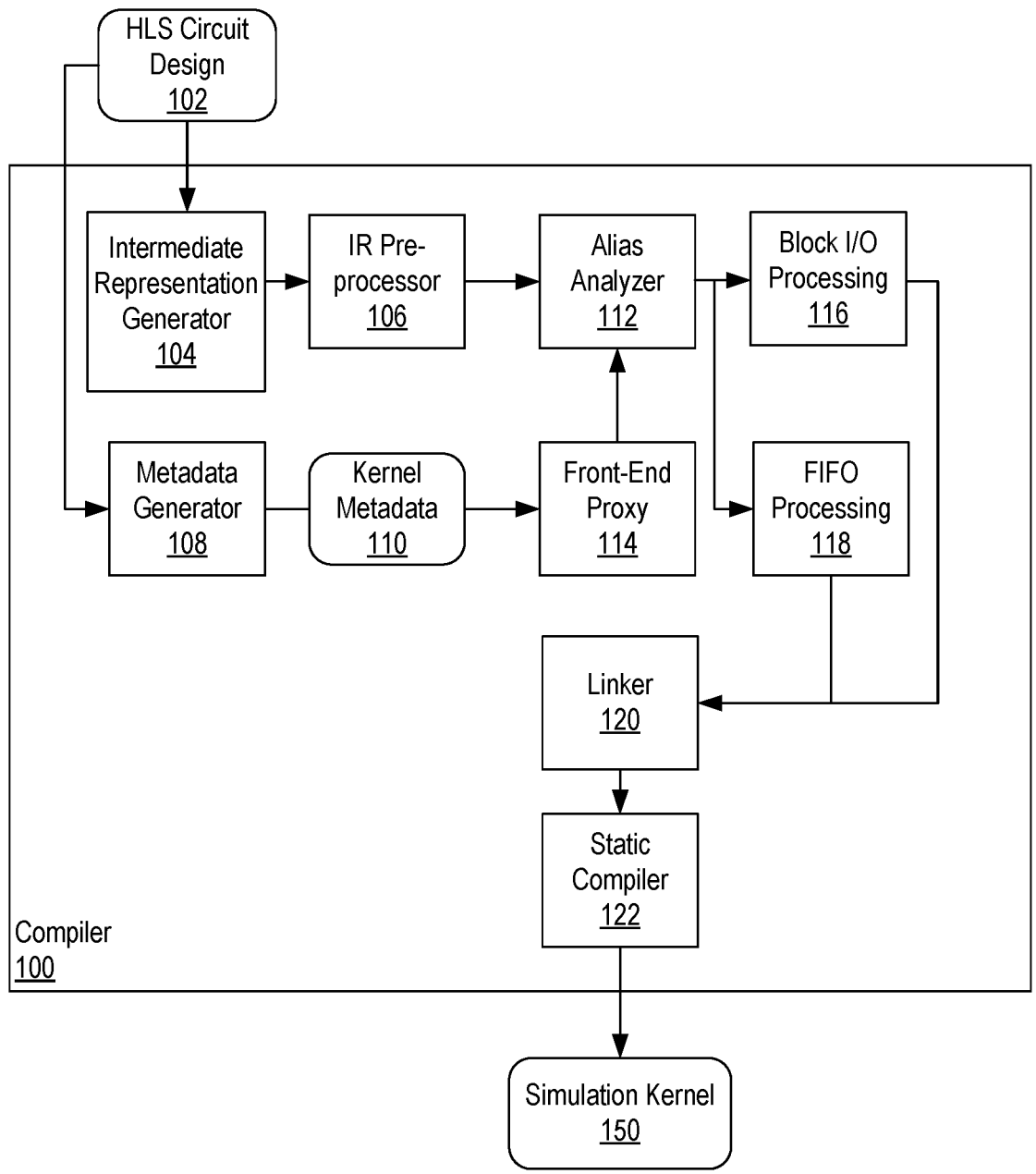
FIG. 1 is a block diagram illustrating an example software architecture for a compiler in accordance with the inventive arrangements described within this disclosure.

This disclosure relates to simulating a design for an electronic system and, more particularly, to generating transaction accurate models from a design for an electronic system expressed in a high-level language. In one aspect, high-level synthesis (HLS) circuit designs may be simulated with increased speed. Further, the HLS circuit designs may be simulated in different simulation environments.

In accordance with the inventive arrangements described within this disclosure, a system is capable of instrumenting an HLS circuit design with program code. Within this disclosure, the term "HLS circuit design" is used synonymously with the term "HLS kernel." The instrumentation performed may replace certain instructions that utilize or reference global address pointers with calls to wrapper functions. The global address pointers represent interactions between the HLS circuit design and other components of the larger electronic system with which the HLS kernel is to interact. For example, accesses, e.g., reads and/or writes, that utilize or reference global address pointers may be considered by the system to be accesses of the HLS circuit design to a device memory.

The system is capable of transforming the HLS circuit design, as instrumented, into a simulation kernel. In one aspect, the simulation kernel is specified in assembly language. In other aspects, the simulation kernel is specified in a high-level language (HLL). The HLS circuit design is not translated into an RTL specification. The instrumentation performed effectively separates the inner-workings of the HLS circuit design from the input/output (I/O) operations that interact with other components of the electronic system being simulated that are external to the HLS circuit design.

Because the HLS circuit design is not converted into an RTL specification, a number of benefits can be achieved. In one aspect, the simulation kernel may be natively executed by a central processing unit (CPU) to provide faster runtime performance than if the HLS circuit design were converted into an RTL specification and emulated. That is, the amount of time needed for simulation is reduced (e.g., simulation speed is increased) through conversion of the HLS circuit design into the simulation kernel. The simulation kernel also provides a functionally correct and transaction accurate model of the HLS circuit design.

In another aspect, the amount of developer time needed to iterate on modifications to the HLS circuit design is reduced since RTL conversion is not performed. Because the HLS circuit design is not translated into another type of model, e.g., an RTL specification, for emulation, HLL (e.g., C/C++) debugging information may be left unchanged and available to users.

In one or more aspects, a wrapper may be generated that includes the wrapper functions referenced by the simulation kernel, as instrumented. The wrapper is capable of providing one or more functions that allow the simulation kernel to communicate with the other models of the larger electronic system in which the HLS circuit design is intended to operate. Depending on the other types of models of the electronic system with which the simulation kernel is to communicate, a different wrapper may be generated. That is, the wrapper may be tailored specifically to the type of other system models with which the simulation kernel is intended to interact.

Accordingly, the simulation kernel may be incorporated into, and simulated as part of, a larger electronic system. The other models of the larger electronic system with which the simulation kernel is capable of interacting include RTL models, transaction-level modeling (TLM) models, and/or other HLL models (e.g., C/C++ models). Further aspects of the inventive arrangements are described below with reference to the figures.

FIG. 1 is a block diagram illustrating an example software architecture for a compiler 100 in accordance with the inventive arrangements described within this disclosure. Compiler 100 may be executed by a data processing system (system). An example data processing system that may be used to execute compiler 100 and perform the various operations described herein is described in connection with FIG. 8. Compiler 100 is capable of receiving an HLS circuit design as input and generating a simulation kernel as output. In one aspect, the simulation kernel is specified as assembly language. The simulation kernel may be included within a packaged intellectual property (IP) and incorporated into any of a variety of different simulation environments for simulating the HLS circuit design as part of a larger circuit design modeled using one or more other types of simulation models.

Within this disclosure, the term "simulation environment" refers to a simulator and any other components of the simulator that are executable to simulate and/or co-simulate a user circuit design individually and/or in combination with one or more other models of a larger electronic or other system. A simulation environment may be capable of performing RTL simulation, TLM simulation, and/or native HLL simulation (e.g., untimed functional simulation).

In the example, HLS circuit design 102 is provided to compiler 100 as input. HLS circuit design 102 is specified in source code as an HLL specification. An example of an HLL is C/C++. In the example, HLS circuit design 102 specifies a circuit design that is to be implemented within a larger electronic system that may be simulated for purposes of verifying functionality of HLS circuit design 102. In one aspect, HLS circuit design 102 may be realized as circuitry within an IC in combination with one or more other portions of the electronic system to be simulated. An example of the larger electronic system in which HLS circuit design 102 may be a part is described in connection with FIG. 7.

In general, compiler 100 is configured to detect data transfers between HLS circuit design 102 and a device memory. The device memory may be an external memory. In one aspect, the device memory is implemented as a Double Data Rate, Synchronous Dynamic Random Access Memory (DDR). Compiler 100 is capable of treating device memory as a global address space. That is, compiler 100 is capable of trapping and routing device memory traffic for memory-mapped communications directed to such a device memory as represented in the simulation environment by a suitable memory simulation model. Compiler 100 is capable of instrumenting HLS circuit design 102 such that the resulting simulation kernel 150 incorporates the instrumentations.

The instrumentations, for example, are capable of invoking wrapper functions that implement memory accesses (e.g., reads and/or writes) to locations in a global address space. The global address space is representative of the device memory. In one example implementation, the wrapper provides I/O functions that may be invoked to perform memory accesses during simulation. In examples where HLS circuit design 102 interacts with an RTL simulation model as the device memory, implementation of the I/O for simulation kernel 150 significantly increases the execution speed of the resulting model of the HLS circuit design during simulation by using TLM. The implementation of the functionality of HLS circuit design 102 as simulation kernel 150 (e.g., in assembly code or other format natively executable by a central processing unit) also increases the execution speed of the resulting simulation model of HLS circuit design 102 within the simulation environment. In some cases, the resulting simulation models, using the techniques described herein for memory accesses, provide an improvement in execution speed on the order of approximately 10×.

Referring to the example of FIG. 1, HLS circuit design 102 is provided to an Intermediate Representation (IR) Generator 104. IR generator 104 is capable of translating HLS circuit design 102 into an IR. As an example, IR generator 104 may be implemented as a Clang Front-End. As defined within this disclosure, the term "intermediate representation" or "IR" is the code, specified as a data structure, used internally by a compiler or a virtual machine to represent source code.

For example, IR generator 104 translates the HLL source code of HLS circuit design 102 into an IR to perform further operations on the source code. The IR is designed to be conducive to further processing, such as optimization of source code and further translation of the source code into other formats (e.g., an executable, RTL, or another programming language including assembly language code). An IR is an accurate representation of the source code that is capable of representing the source code without loss of information and is independent of any particular source or target language. In some cases, the IR may use a static single assignment (SSA) compliant form. Examples of IRs include, but are not limited to, stack machine code, two address code, three address code, and/or a graph data structure. Other examples of intermediate representations may include, but are not limited to, Low Level Virtual Machine (LLVM) intermediate representation and GNU Compiler Collection (GCC) intermediate representation.

Listing 1 is an example of HLS circuit design 102 that may be provided to compiler 100 for processing.

Listing 1

```
1    #define NAME vadd
2    #define TYPE int
3
4    void NAME (TYPE *in1, TYPE* in2, TYPE *out, TYPE size)
5    {
6
```

Listing 1 -continued

```
7        for ( int i=0; i<size; i++) {
8            out[i] = in1[i] + in2[i];
9        }
10   }
```

IR generator 104 provides the resulting IR from HLS circuit design 102 to IR pre-processor 106. IR pre-processor 106 is capable of performing one or more optimizations on the IR received from IR generator 104. In one example implementation, IR pre-processor 106 is capable of performing a scalar replacement of aggregates operation on the IR. For example, IR pre-processor 106 is capable of finding aggregates and placing individual components into separate registers to locate and remove instances of double pointers. The transform may be used to break up alloca instructions of aggregate type (structure or array) into individual alloca instructions for each member if possible. Then, if possible, IR pre-processor 106 transforms the individual alloca instructions into a clean scalar SSA form.

IR pre-processor 106 also is capable of performing a mem2reg transform. The mem2reg transform is capable of pushing unnecessary loads to the registers resulting in fewer pointers within the IR to be analyzed. In the context of the IR structure, an unnecessary load does not refer to so called "dead code." Rather, an unnecessary load refers to a load operation that may be avoided or omitted without changing the algorithmic nature of the program code (e.g., without changing the functionality of the program code). Application of the mem2reg transform results in fewer data movements to device memory and, as such, faster execution. IR pre-processor 106 is also capable of invoking an inliner transform that ensures that functions that are used and explicitly marked for inlining are inlined for proper or correct processing in subsequent passes.

HLS circuit design 102 may also be provided to a metadata generator 108. Metadata generator 108 applies predetermined conventions to the source code of HLS circuit design 102 to generate kernel metadata 110 therefrom. Kernel metadata 110 may specify information derived from HLS circuit design 102 including, but not limited to, properties of HLS circuit design 102, argument properties, and port properties. Properties of HLS circuit design 102 may include the particular control protocol to be used and mailbox and auto-restart support. Argument properties may include argument names, the particular port associated with the argument, and/or address offsets. Port properties may include port type, read/write (r/w) mode, and port width.

An example of kernel metadata 110 that compiler 100 is capable of generating from HLS circuit design 102 is provided in Listing 2. The example of Listing 2 may be generated by processing the example source code of Listing 1.

Listing 2

```
1    <?xml version= "1.0" encoding="UTF-8"?>
2    <root versionMajor="1" versionMinor="5">
3      <kernel name="vadd" language="c" vlvn=xilinx.com:hls:vadd: 1.0" attributes=""
hash="" preferredWordGroupSizeMulitple="0" wordgroupSize="1" debug="true"
compileOptions="-g -I /wrk/xhdhdnobkup2/Emulation-
Example/systemc_xo_gen/vadd_func_emu/src" profileType="none" interrupt="true"
hwControlProtocol="ap_ctrl_chain" counedAutoRestart="0" deadlockDetection="local"
mailbox="none" swReset="false">
4        <ports>
5          <port name="M_AXI_GMEM" mode="master" range="0xFFFFFFFF"
dataWidth="32" portType="addressable" base="0x0"/>
```

Listing 2

```
6          <port name="S_AXI_CONTROL" mode="slave" range="0x3C"
dataWidth="32" portType="addressable" base="0x0"/>
7          </ports>
8          <args>
9             <arg name="in1" addressQualifier="1" id="0" port="M_AXI_GMEM"
size="0x8" offset="0x10" hostOffset="0x0" hostSize="0x8" type="void*"/>
10            <arg name="in2" addressQualifier="1" id="1" port="M_AXI_GMEM"
size="0x8" offset="0x1C" hostOffset="0x0" hostSize="0x8" type="void*"/>
11            <arg name="out" addressQualifier="1" id="2" port="M_AXI_GMEM"
size="0x8" offset="0x28" hostOffset="0x0" hostSize="0x8" type="void*"/>
12            <arg name="size" addressQualifier="0" id="3" port="S_AXI_CONTROL"
size="0x4" offset="0x34" hostOffset="0x0" hostSize="0x4" type="unsigned int*"/>
13         </args>
14         <compileWorkGroupSize x="1" y="1" z ="1"/>
15         <maxWorkGroupSize x = "1" y="1" z="1"/>
16      </kernel>
17   </root>
```

Front-end proxy 114 is capable of embedding kernel metadata 110 on the block level functions of the generated IR. The embedded metadata helps compiler 100 to know or determine which of the arguments points to the global address space from the block level. For purposes of illustration, referring to the example metadata of Listing 2, in1, in2, and out refer to M_AXI_GMEM connected device memory (e.g., DDR). Front-end proxy 114 is a lightweight mechanism that is configured to understand metadata and convert the metadata into IR.

Alias analyzer 112 is capable of applying one or more different analysis techniques to determine whether a given pointer is a global address pointer. Pointers that are determined not to be global address pointers are determined to be local address pointers. For example, alias analyzer 112 is capable of using available alias analysis techniques using different compilation tools such as LLVM alias analysis, Collected Results of Basic Alias Analysis, Type-based alias analysis, and inter-procedural analysis. Alias analyzer 112 also may use Definition-Use (Def-Use) chain that includes a definition of a variable and all uses reachable from that definition without any other intervening definitions to determine whether a given pointer points to the global address space. In applying the foregoing alias analysis techniques, alias analyzer 112 is capable of determining whether each pointer references the global address space or the local address space.

In accordance with the inventive arrangements, compiler 100 is capable of differentiating between global address pointers and local address pointers without actually determining the particular address buffer or object to which each pointer indicates or corresponds. That is, compiler 100 differentiates between global and local address pointers without identifying buffer object interfaces across different function blocks. Other conventional compiler techniques in HLS make a good faith effort to identify buffer object-interfaces across function blocks. The techniques described in accordance with the inventive arrangements differ from conventional techniques in this regard. In general, alias analyzer 112 determines, for each pointer, whether the pointer is a local address pointer or aliases to a local address pointer. Alias analyzer 112 determines that local pointers do not represent valid device memory data traffic while global address pointers do represent valid device memory data traffic.

In one or more example implementations, alias analyzer 112 determines that all known aliases of the top module are global address pointers that drive device memory data traffic. The following examples illustrate the processing of memory-mapped communication of HLS circuit design 102 by compiler 100.

In one aspect, for the top function, compiler 100 uses front-end guidelines to determine which pointers reside in the global address space. Compiler 100 determines that all known aliases of the top function are driving device memory data traffic. In the example source code of Listing 3, the pointers a and b will result in read operations while the pointer c will result in a write operation. In Listing 3, alias analyzer 112 determines that pointers a, b, and c are known aliases from the set of device pointers (a, b, c). Therefore, alias analyzer 112 determines that pointers a, b, and c are global address pointers.

Listing 3

```
// Global Address Space a , b, c
void vadd0(int *a , int * b , int *c){
    c[0]= a[0] + b[0];   // <= device ddr traffic
}
```

In the example source code of Listing 4, the pointer d is local to the function vadd1. Alias analyzer 112 is capable of determining that the pointer d is not known from or determined from the set of pointers (a, b, c). That is, pointer d is not an alias of pointer a, b, or c. As such, alias analyzer 112 determines that pointer d in Listing 2 is a local address pointer.

Listing 4

```
// Global Address Space a , b, c
// Local Address Space d
void vadd1(int *a , int * b , int *c){
    int d[1];
    d[0]= a[0] + b[0];   // <= d is not alias of a, b or c
    c[0] = d[0];
}
```

In the example source code of Listing 5, alias analyzer 112 determines that pointer d is a known alias of the set of pointers (a, b, c). In the example, alias analyzer 112 determines that pointer d is known from pointer c. Accordingly, alias analyzer 112 determines that pointer d is a global address pointer.

Listing 5

```
// Global Address Space a , b, c
// Alias Global Address Space d
void vadd2(int *a , int * b , int *c){
    int *d = c;   // <= d is Alias of c
    d[0]= a[0] + b[0];
}
```

In the example source code of Listing 6, compiler 100 determines that the function vadd3 has a call site for vadd3_help where the pointer set (a, b, c) becomes (a, b, c, d). While iterating vadd3, the alias set is (a1, b1, c1) as derived from (a, b, c, d). Accordingly, alias analyzer 112 determines that the pointer set (a1, b1, c1), as used by vadd_help, are global address pointers. The pointer index, being defined locally in vadd3, is determined to be a local address pointer.

Listing 6

```
// Global Address Space a , b, c
// Global Address Space d used in call-site vadd3_help
void vadd3_help(int *a1 , int * b1 , int *c1, int* i){
// a1 ,b1 ,c1 classified as global address space from call-site
    c1[*i] = a1[*i] + b1[*i];
}
void vadd3(int *a , int * b , int *c){
    int *d = c;   // <= d is Alias of c
    int index
    vadd3_help(a,b,d,&index);
}
```

In the examples provided within this disclosure, one example of a restriction imposed on HLS circuit design 102 that aids compiler 100 in performing the analysis described herein is that a pointer cannot point to device memory and a local array (e.g., a local address space). This restriction on the source code of HLS circuit design 102 alleviates the need for compiler 100 to check whether further analysis of a single call-site takes different address space pointers.

In the foregoing examples, alias analyzer 112 is capable of determining that a given pointer, if not aliased to a global address pointer, is pointing to local memory and is a local address pointer. Alias analyzer 112 is capable of annotating the IR to indicate which pointers are global address pointers representing device memory (e.g., external memory and/or DDR) accesses.

Block I/O processing 116 is capable of instrumenting the IR based on the annotations generated by alias analyzer 112. In one or more example implementations, block I/O processing 116 is capable instrumenting load and store instructions within the IR that utilize a global address pointer. For example, block I/O processing 116 is capable of replacing each load instruction that uses a global address pointer with a wrapper function that reads the location indicated by the global address pointer. Block I/O processing 116 also is capable of replacing each store instruction that uses a global address pointer with another wrapper function that writes data to the location indicated by the global address pointer.

Referring to the example of Listing 1, line 8 represents two reads corresponding to in1[i] and in2[i] and a write corresponding to out[i]. Within the corresponding IR, the two reads become load operations and the write becomes a store operation. These operations may be replaced with the wrapper functions described.

The wrapper functions may be implemented as callback functions provided by a wrapper that is generated for use with the simulation kernel 150 that is to be generated. The simulation kernel 150, by way of the instrumented program code, communicates with the wrapper. The wrapper communicates, on behalf of simulation kernel 150 with other simulation models of the simulation environment. The wrapper functions may include a function for performing a load, a function for performing a store, and a function for performing a read each corresponding to a memory-mapped interface of HLS circuit design 102. The wrapper functions may include a function for sending stream data from HLS circuit design 102 and a function for HLS circuit design 102 to receive stream data.

Block I/O processing 116 is also capable of instrumenting the IR with a specialized streaming intrinsic that implements the streaming communications in simulation kernel 150 that is being generated. Compiler 100 may then update the intrinsics to identify the simulation kernel 150 and connect simulation kernel 150 to the streaming I/O infrastructure of the simulation environment.

FIFO processing 118 is capable of recognizing queue structures within the IR as FIFO requirements. FIFO processing 118 is capable of instrumenting the IR by connecting the FIFO requirements, by way of a function call, to the actual object of the FIFO. FIFO processing 118 routes the data traffic via the function call. FIFO processing 118 determines, for example, where FIFOs are needed to synchronize two different blocks of the system.

In one aspect, FIFO processing 118 determines whether a given stream class is part of the block level interface of HLS circuit design 102. In the case where the stream class is part of the block level interface, FIFO processing 118 instantiates the FIFO as part of a streaming interface for HLS circuit design 102. In the case where the stream class is not part of the block level interface, FIFO processing 118 instantiates a FIFO object that becomes part of simulation kernel 150 (e.g., an internal FIFO memory).

Linker 120 is capable of linking the instantiated FIFO objects with the IR as output (e.g., as instrumented) from block I/O processing 116. Static compiler 122 is capable of generating simulation kernel 150 from the linked IR and instantiated FIFO objects.

The example of FIG. 1 illustrates that compiler 100 is capable of creating I/O callbacks and stubs to facilitate I/O. Compiler 100 leaves debugging information unchanged while maintaining the programming model of an OpenCL device.

For purposes of illustration, Listing 7 illustrates a portion of example IR generated from a user's HLS circuit design 102.

Listing 7

```
29  for.body: ; preds = %for.cond
30    %idxprom = sext i32 %i.0 to i64, !dbg !32
31    %arrayidx = getelementptr inbounds i32, i32* %in1, i64 %idxprom, !dbg !32
32    %0 = call i32 @tlm_load_p0i32(i8* %This, i32* %arrayidx), !dbg !32, !ddr !34
33    %idxprom1 = sext i32 %i.0 to i64, !dbg ! 35
```

Listing 7

```
34    %arrayidx2 = getelementptr inbounds i32, i32* %in2, i64 %idxprom1, !dbg !35
35    %1 = call i32 @tlm_load_p0i32(i8* %This, i32* %arrayidx2), !dbg !35, !ddr !34
36    %add = add nsw i32 %0, %1, !dbg !36
37    %idxprom3 = sext i32 %i.0 to i64, !dbg !37
38    %arrayidx4 = getelementptr inbounds i32, i32* %out, i64 %idxprom3, !dbg !37
39    call void @tlm_store_p0i32(i8* %This, i32* %arrayidx4, i32 %add), !dbg !38,
         !ddr !39
40    br label %for.inc, !dbg !40
```

In the example of Listing 7, the system determines by way of alias analysis that the @tlm_load of line 32 loads the pointer at array index "arrayidx" and that "arrayidx" is defined on line 31 as being derived from in1. The system determines that the alias is a "must alias". The system determines that the alias arryidx and in1 are pointing to the same memory location.

The system is capable of performing instrumentation by replacing the @tlm_load instruction with a call to a wrapper function @_tlm_load that provides a definition for the wrapper function and routes I/O traffic to the wrapper for processing. In this example, the wrapper is a SystemC wrapper that uses system simulation semantics to communicate using a TLM operation. Still, in one or more examples, the TLM that is implemented may model stream hardware transactions or memory-mapped hardware transactions and does not imply strict conformance with SystemC TLM. Rather, the simulation kernel may operate on a transaction-accurate level to simulate hardware-based stream transactions and/or hardware-based memory-mapped transactions. It should be appreciated that the system will replace other load and/or store instructions as generally described albeit using appropriate read and/or write wrapper functions.

Without using the instrumentation techniques described herein, in the case of communicating with an RTL simulation model, the simulation kernel would communicate through the RTL simulation environment infrastructure to access the device memory. This RTL simulation environment infrastructure executes more slowly by providing pin level simulation. In accordance with the inventive arrangements described herein, the memory accesses to device memory, in effect, are converted into a C/C++ communications that are executed in significantly less time than would otherwise be the case using the RTL simulation environment infrastructure. The device memory model, for example, may provide functional simulation hooks for access.

Without using the instrumentation techniques described herein, in the case of communicating with a TLM simulation model, the simulation kernel communicates through the TLM simulation environment infrastructure to access the device memory. This TLM simulation environment infrastructure executes more slowly than C/C++ communications since the environment provides port level state machine transactions. In accordance with the inventive arrangements described herein, the memory accesses to device memory, in effect, are converted into C/C++ communications that are executed in significantly less time than an TLM (e.g., SystemC) transaction.

In one or more example implementations, the wrapper may be configured to dynamically determine the type of simulation model with which the wrapper is communicating and the types of accesses that are available. The wrapper may then implement a supported communication type (e.g., C/C++ instead of RTL; C/C++ instead of TLM). The determination may be performed on a per transaction basis.

Figure 2:
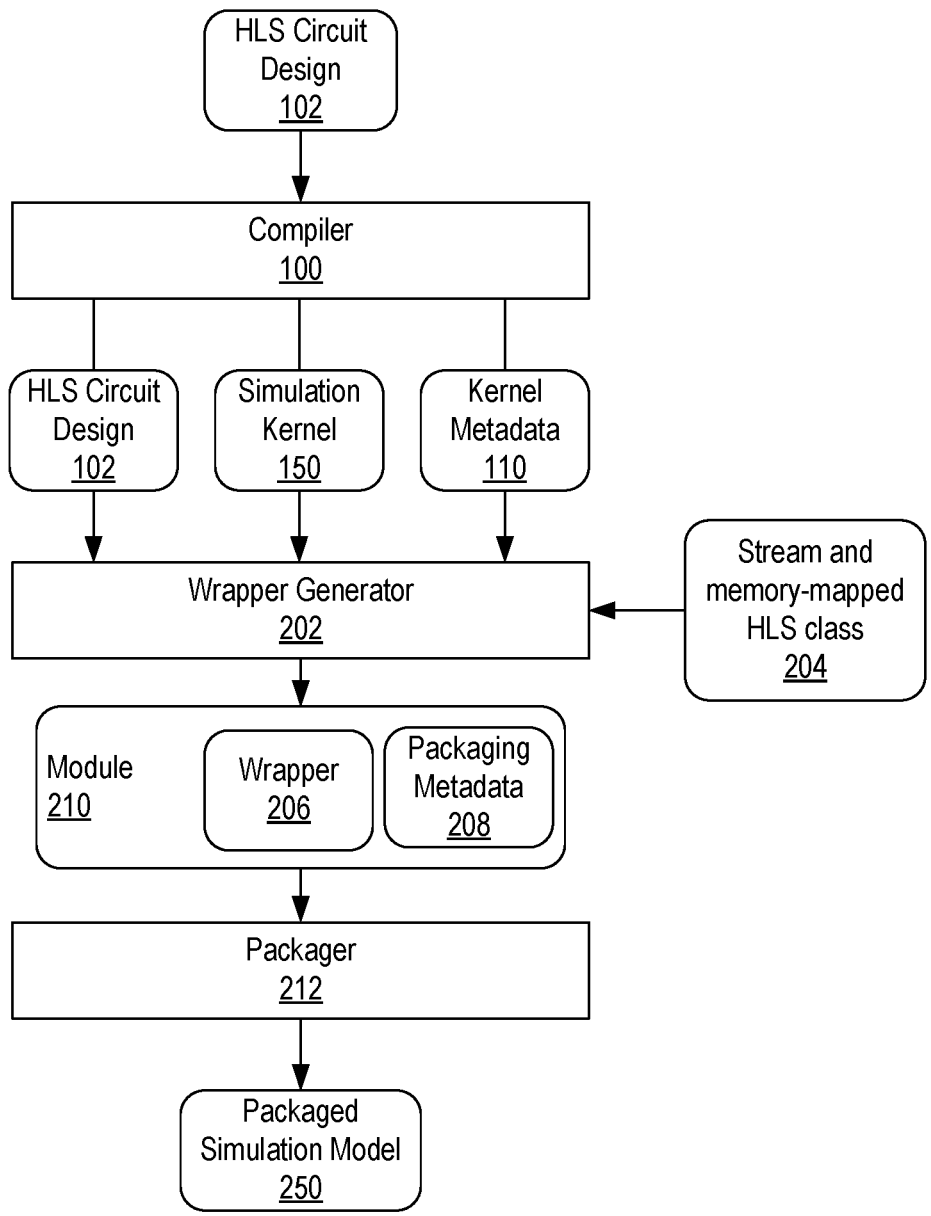
FIG. 2 is a block flow diagram illustrating the creation of a packaged simulation model.

FIG. 2 is a block flow diagram illustrating the creation of a packaged simulation model 250. The operations described in connection with FIG. 2 may be performed by a data processing system such as the data processing system described herein in connection with FIG. 8. Depending on the particular type of wrapper that is generated for HLS circuit design 102, the resulting packaged simulation model 250 may be incorporated into any of a variety of different types of simulation platforms. For example, in using a transaction level model wrapper such as one specified in SystemC, packaged simulation model 250 may use a TLM interface to interact with other TLM simulation models and/or RTL simulation models. In using a native HLL (e.g., C/C++) wrapper, packaged simulation model 250 may interact with other native HLL (e.g. C/C++) models.

In the example of FIG. 2, compiler 100 receives HLS circuit design 102. Compiler 100 is capable of performing the operations described in connection with FIG. 1. As illustrated, compiler 100 is capable of providing HLS circuit design 102 (e.g., HLL source code), simulation kernel 150, and kernel metadata 110 to wrapper generator 202.

In the example of FIG. 2, wrapper generator 202 is configured to generate a wrapper 206. Wrapper generator 202 is capable of providing, as part of the wrapper, I/O channels to simulation kernel 150 and the I/O subsystem of the simulation environment. In one aspect, wrapper 206 provides utilities to manage generic callbacks. As noted, an example of a TLM wrapper is a SystemC wrapper that is capable of interacting with RTL simulation models and/or TLM (e.g., SystemC) models. It should be appreciated that wrapper generator 202 may be configured to generate a different type of wrapper such as a native C/C++ wrapper.

Continuing with the example of FIG. 2, wrapper generator 202 is capable of generating wrapper 206 based on HLS circuit design 102, kernel metadata 110, and simulation kernel 150. In the example, wrapper generator 202 accesses stream and memory-mapped HLS class 204 to generate a module 210. In one or more example implementations, wrapper generator 202 generates module 210 to include wrapper 206 and packaging metadata 208.

Packager 212 receives module 210 and generates packaged simulation model 250. Packager 212 may also receive kernel metadata 110 and simulation kernel 150 and include both components within packaged simulation model 250. Packaged simulation model 250 may conform to known package IP (Intellectual Property) standards for simulation models. In an example, packaged simulation model 250 may conform to the IP-XACT format (e.g., IEEE 1685-2014 and/or IEC 62014-4:2015). Packaged simulation model 250 may be used in different simulation contexts. For example, packaged model 250, depending on the type of wrapper that is generated, may be used for RTL co-simulation, TLM simulation, as an external test bench, or as part of a software emulation (e.g., a native C/C++ simulation of the electronic system).

As discussed, kernel metadata 110 describes the block level interface for simulation kernel 150. Packaging metadata 208 provides information for interfacing with packaged simulation model 250 in general. For example, packaged simulation model 250 may include Verilog, VHDL, and/or SystemC file sets. Packaging metadata 208 may indicate how to access and interact with the respective file sets. In another example, packaging metadata 208 may specify, to a simulation environment, how to interact with packaged simulation model 250 and specify information such as the interfaces of packaged simulation model 250, names of interfaces, initial values, and/or data widths. Packaging metadata 208 may also specify different configurations for memory-mapped and streaming interfaces.

With the inclusion of simulation kernel 150 within packaged simulation model 250, packaged simulation model 250 may be incorporated into a simulation environment and execute, once compiled, natively on a particular processor (e.g., an x86 processor) to achieve faster runtimes for performing the computations of HLS circuit design 102 in the simulation. As such, the behavior and functionality of HLS circuit design 102 may be verified against other components of the system that may be implemented as TLM simulation models, RTL simulation models, and/or C/C++ simulation models.

The instrumentation of simulation kernel 150 described in connection with FIG. 1 allows any reads or writes to what is considered device memory (e.g., simulation models of device memory in a simulation environment) to be performed using the wrapper functions. Use of the wrapper functions may communicate with the device memory simulation model. The device memory simulation model may be an RTL simulation model. In one or more other example implementations, the device memory simulation model may provide hooks for interacting with the model via HLL-based function calls that circumvent the RTL simulation infrastructure of the simulation environment. This capability allows packaged simulation model 250 to achieve faster runtimes by invoking wrapper functions that may circumvent the RTL infrastructure and perform memory reads and/or memory writes to the memory simulation model using HLL function calls. The reading and writing of the memory simulation model becomes a high-level function call that is not performed in a cycle accurate manner as other RTL simulation interactions thereby executing faster than would otherwise be the case.

Figure 3:
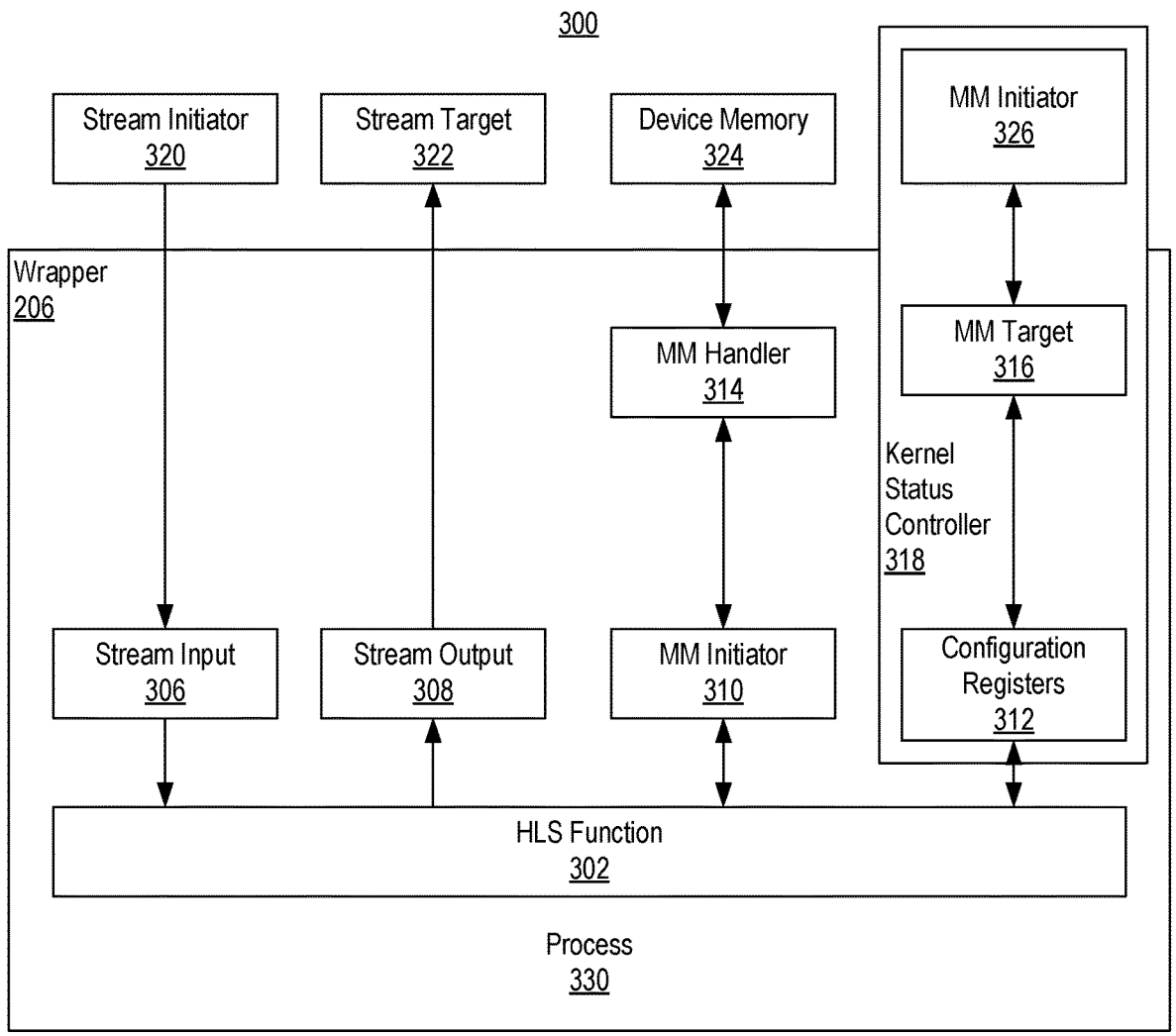
FIG. 3 illustrates an example runtime simulation architecture that utilizes a wrapper in combination with a High-Level Synthesis function.

FIG. 3 illustrates an example runtime simulation architecture 300 that utilizes a wrapper in combination with an HLS function. In the example of FIG. 3, HLS function 302 represents a compiled version of simulation kernel 150 as obtained from packaged simulation model 250. In the example, HLS function 302 remains part of the processor (e.g., x86) execution flow. I/O communication is managed by the TLM API (e.g., SystemC-TLM API) implemented by wrapper 206.

Wrapper 206 provides stream input 306, stream output 308, memory-mapped (MM) initiator 310, and memory-mapped handler 314. Kernel status controller 318 may be implemented to provide control over HLS function 302. In one aspect, kernel status controller 318 may implement control functions that are responsive to a control protocol such as AXI-Lite. As shown, kernel status controller 318 provides configuration registers 312, a memory-mapped target 316, and a memory-mapped initiator 326. In the example, stream input 306, stream output 308, memory-mapped initiator 310, and memory-mapped handler 314 represent functions provided by wrapper 206 from the stream and memory-mapped HLS class 204. The wrapper functions are called by way of instrumented program code (e.g., callbacks) of HLS function 302.

Memory-mapped initiators 310, 326, and stream initiator 320 represent entities that generate read and/or write transactions on slave memory. Memory-mapped target 316 and stream target 322 represent entities that facilitate requests made by initiators.

In the example of FIG. 3, stream input 306 and stream output 308 are capable of performing data type conversions during simulation between TLM data type or TLM transactions and HLS data types corresponding to the particular arguments used or understood by HLS function 302. As an example of a data type conversion, transaction packets may be converted to user level data types and vice versa. For example, stream input 306 is capable of converting received TLM data types for stream data transfers from stream initiator 320 in the runtime simulation environment to into HLS data types. Stream output 308 is capable of converting received HLS arguments into TLM data types for stream data transfers to stream target 322 within the runtime simulation environment. In this example, stream initiator 320 may be a TLM simulation model within the running simulation that is responsible for providing data from a source to HLS function 302 by way of stream input 306. Stream target 322 may be a TLM simulation model within the running simulation that receives stream data from HLS function 302 by way of stream output 308.

Memory mapped handler 314 is capable of communicating with device memory 324 (e.g., a model thereof) to convert TLM data types for memory-mapped data transfers into HLS data types and vice-versa. Wrapper 206 also provides memory-mapped handler 314. Memory-mapped target 316 is included in kernel status controller 318. Configuration registers 312 are configured by control data received via memory-mapped target 316 to control operation (e.g., start, stop, etc.) of HLS function 302 by way of a standard control interface.

As an example, a transaction payload may contain 4 bytes of data. HLS function 302 may interpret the data as unsigned, signed, int, or float. In this example, the handlers (e.g., memory-mapped handler 314) is capable of performing the conversion from raw bytes of data to the expected data type.

In the example, HLS function 302 and wrapper 206 may execute in an independent process 330.

Figure 4:
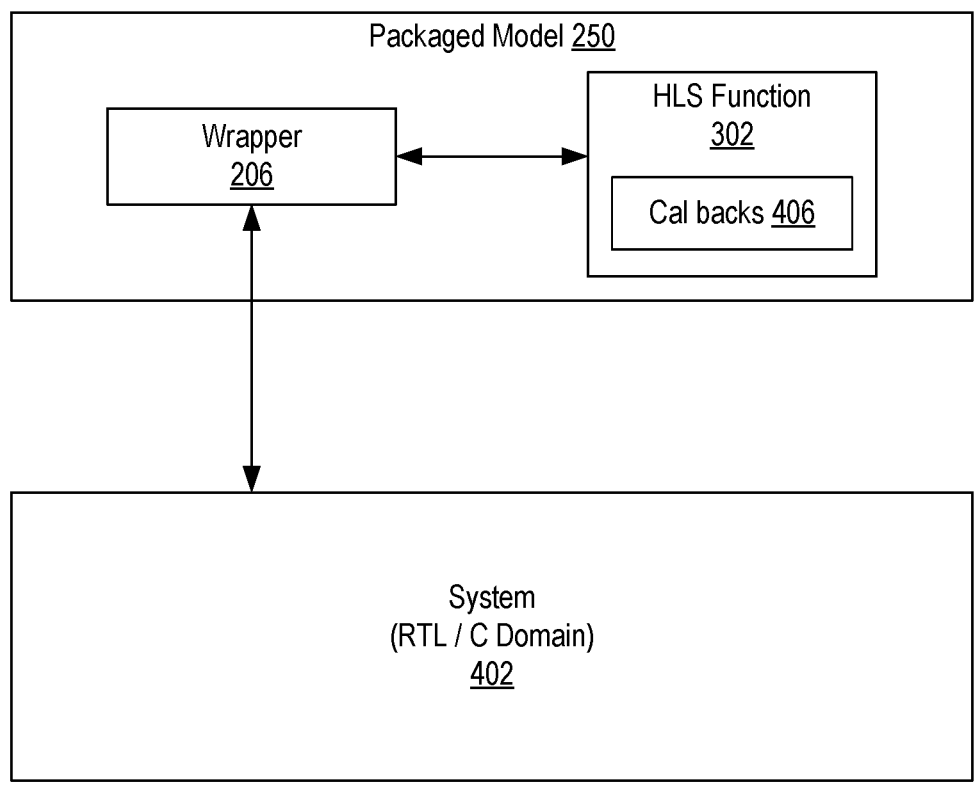
FIG. 4 illustrates an example of a packaged simulation model interacting with a system during runtime of a simulation.

FIG. 4 illustrates an example of packaged simulation model 250 interacting with a system 402 simulated at runtime using a simulation environment. System 402 may be one specified in RTL (e.g., RTL domain). Wrapper 206 is capable of communicating with system 402 and translating data between RTL and TLM domains. For example, wrapper 206 may be implemented as a SystemC wrapper.

The source code of Listing 8 illustrates an example implementation of wrapper 206. In the example of Listing 8, wrapper 206 includes connection sockets for interacting with system 402 via named input and output. Communication between wrapper 206 and HLS function 302 may be implemented by way of a callback 406 inserted by compiler 100 within HLS function 302. Callbacks 406 are configured to interact with wrapper 206. For purposes of illustration, the source code of Listing 8 is specified in SystemC.

Listing 8

```
#include "increment_tlm.h"
increment_tlm::increment_tlm(sc_module_name name,
xsc::common_cpp::properties& _properties) : xsc:xtlm_ap_ctrl_none(name)
{
   DEFINE_XTLM_AXIS_SLAVE_IF(input_s, 32);
   DEFINE_XTLM_AXIS_MASTER_IF(output_s, 32);
   input = new hls::stream<ap_axiu<32,0,0,0>>(input_s->su);
   output = new hls::stream<ap_axiu<32,0,0,0>>(output_s->su,output_s->mm);
   SC_THREAD(main_thread);
}
void increment_tlm::main_thread( )
{
   while(auto_restart_condition( ))
      increment(*input,*output);
}
```

Figure 5:
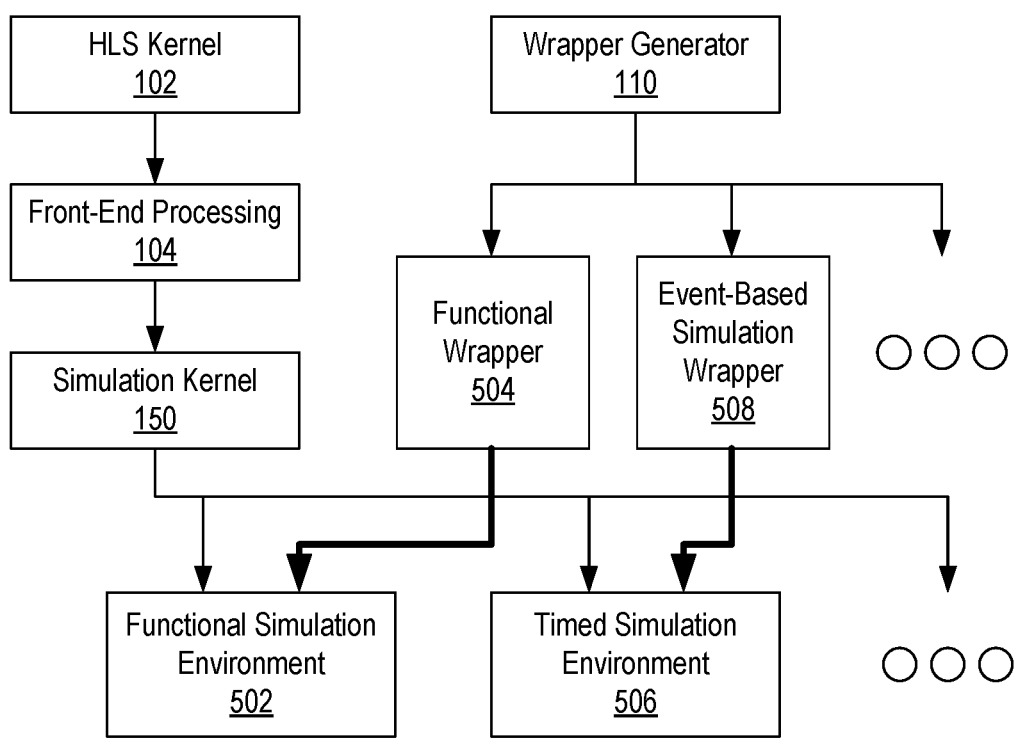
FIG. 5 illustrates certain operative features of a compiler in accordance with the inventive arrangements described herein as applied to different simulation environments.

FIG. 5 illustrates certain operative features of compiler 100 as applied to different simulation environments. The example of FIG. 5 illustrates that simulation kernel 150 generated by compiler 100 may be provided with an appropriate, and simulation environment-specific, wrapper to simulate operation of simulation kernel 150 in the different simulation environments. For example, simulation kernel 150 may be provided to functional simulation environment 502 with a functional wrapper 504 (e.g., a C/C++ wrapper). In another example, simulation kernel 150 may be provided to timed simulation environment 506 with event-based simulation wrapper 508 (e.g., RTL wrapper). The same assembly code that is executable by the target computing system may be used across different types of simulators by providing a domain-specific or appropriate wrapper allowing the HLS function to interface with the other components of the electronic system being simulated using the simulation environment. In each case, simulation speed may be increased due to the use of assembly code. Wrapper generator 202, in generating a domain-specific wrapper for simulation kernel 150, decouples the simulation environment from the kernel and also facilitates faster runtimes.

Figure 6:
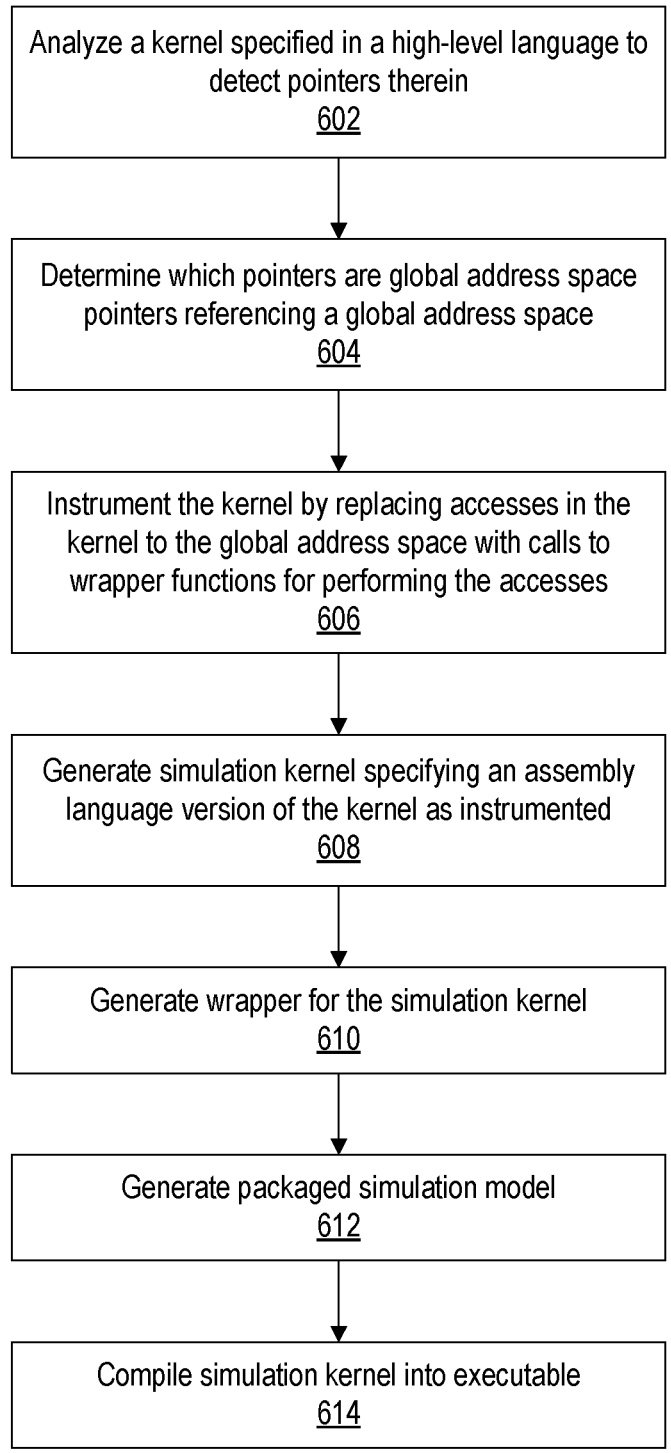
FIG. 6 is an example method illustrating certain operative features of the inventive arrangements described herein.

FIG. 6 is an example method 600 illustrating certain operative features of the inventive arrangements described herein. Method 600 may be performed by a data processing system as described in connection with FIG. 8.

In block 602, the system is capable of analyzing a kernel specified in a high-level language to detect pointers therein. For example, compiler 100 is capable of detecting pointers in HLS circuit design 102. Compiler 100 may convert HLS circuit design 102 into an IR and perform the analysis described in connection with FIG. 1 (e.g., alias analyzer 112). In block 604, the system is capable of determining which of the pointers are global address space pointers referencing a global address space. For example, compiler 100 (e.g., alias analyzer 112) is capable of classifying pointers as global address space pointers or as local address space pointers as performed by alias analyzer 112 and described in connection with FIG. 1. In the examples, the system determines that the global address space pointers indicate accesses to an external memory.

For example, as part of block 604, alias analyses may respond to a query with a "Must" alias response indicating that two pointers always point to the same object, a "May" alias response indicating that two pointers might point to the same object, or a "No" alias response indicating that two pointers are known to never point to the same object. In the case of a No Alias response, the system is capable of removing pointers that do not present or map to the global address space.

In another aspect, as part of block 604, the system is capable of identifying or determining the stream classes that are part of the block level interface of HLS circuit design 102.

In block 606, the system is capable of instrumenting the kernel by replacing accesses in the kernel to the global address space with calls to wrapper functions for performing the accesses. For example, block I/O processing 116 of compiler 100 is capable of performing the instrumentation where load and/or store instructions of the IR of HLS circuit design 102 are replaced with calls to the corresponding wrapper functions.

In an example implementation, block 606 may be performed by the system by replacing load instructions in the IR of the HLS circuit design with read wrapper functions. Block 606 also may be performed by the system by replacing store instructions in the IR of the HLS circuit design with write wrapper functions.

In one or more example implementations, the system is capable of determining that a selected global address space pointer specifies a memory-mapped connection. In that case, the instrumenting includes replacing an access that uses the selected global address space pointer with a call to a native high-level language I/O function that accesses a memory simulation model. For example, block I/O processing of the compiler 100 is capable of performing the instrumentation of the IR of the HLS circuit design.

In one or more examples, as part of block 606, the system is capable of further instrumenting the kernel by performing the FIFO processing illustrated in FIG. 1 in connection with FIFO processing block 118. For example, FIFO processing 118, for a stream class that is part of the block level interface of HLS circuit design 102 (e.g., as determined in block 604), instantiates the FIFO as part of a streaming interface for HLS circuit design 102. Instantiation of the FIFO as part of the streaming interface for HLS circuit design 102 implements streaming communications with components of the system external to the kernel during runtime of the simulation.

In block 608, the system is capable of generating a simulation kernel specifying an assembly language version of the kernel as instrumented. For example, compiler 100 is capable of outputting simulation kernel 150 as described in connection with FIG. 1.

Referring to FIG. 6, blocks 610-614 may be optionally performed by the system. In block 610, the system is capable of generating a wrapper for the simulation kernel. The wrapper includes the wrapper functions for performing the accesses. For example, wrapper generator 202 is capable of generating the wrapper as described in connection with FIG. 2.

In one aspect, the wrapper is a TLM wrapper configured to communicate with one or more RTL simulation models and/or one or more TLM simulation models. In another aspect, the wrapper is a native HLL wrapper configured to communicate with one or more native HLL models.

In block 612, the system is capable of generating the packaged simulation model that is operable with a simulation environment. The packaged simulation model includes the wrapper and the simulation kernel. For example, Packager 212 is capable of generating the packaged simulation model as described in connection with FIG. 2.

In block 614, the system optionally compiles the simulation kernel into an executable version of the kernel. The executable version of the kernel also may be included in the packaged simulation model.

Figure 7:
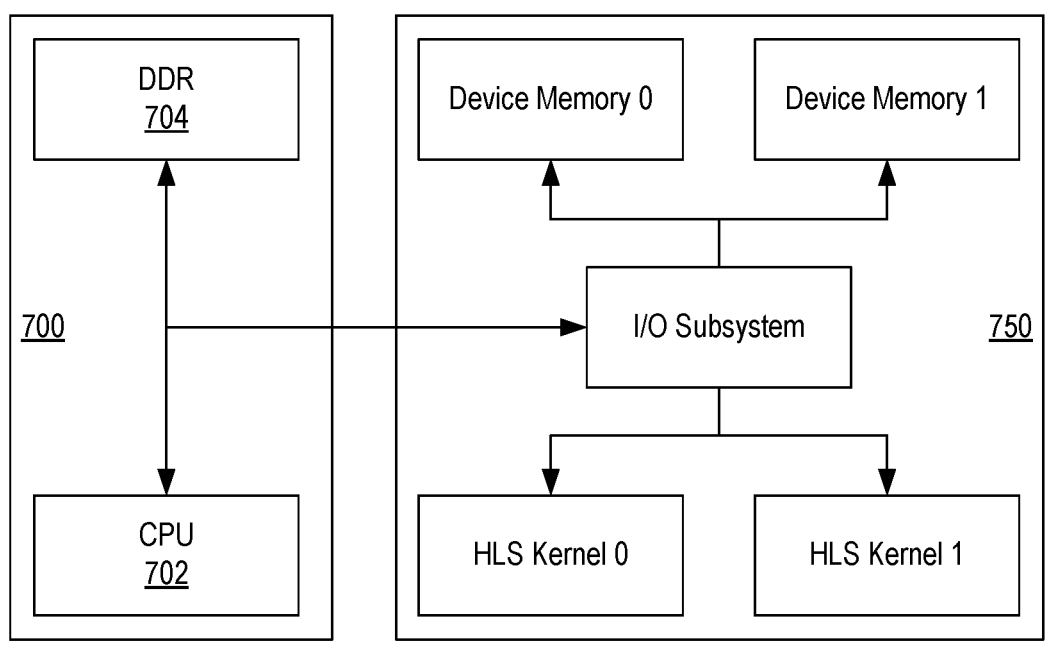
FIG. 7 illustrates an example of a physical system that may be simulated using the inventive arrangements described herein.

FIG. 7 illustrates an example of a physical system that may be simulated using the inventive arrangements described herein. In the example of FIG. 7, a computer system 700 is illustrated as including a CPU 702 and a DDR (e.g., memory) 704. The computer system 700 is communicatively linked to an I/O subsystem of an accelerator 750. In the example, the accelerator 750 includes two HLS kernels 0 and 1 communicatively linked to device memories 0 and 1. The example of FIG. 7 illustrates that a "device memory" is a memory that is accessible to an HLS kernel by way of an I/O subsystem. The device memory may also be accessible by the computer system 700. Still, device memory is not part of the host computer system, but rather part of the accelerator 750. In the example, each device memory is a memory that exists outside of the scope of the kernels (e.g., is not within the kernel(s) or the block level interface provided by the kernel(s)).

In one aspect, accelerator 750 may be implemented as an acceleration card that includes an IC in which HLS kernels are implemented. The acceleration card may include device memory implemented external to the IC. In another example, accelerator 750 may represent an SoC that includes each of the illustrated components therein.

Figure 8:
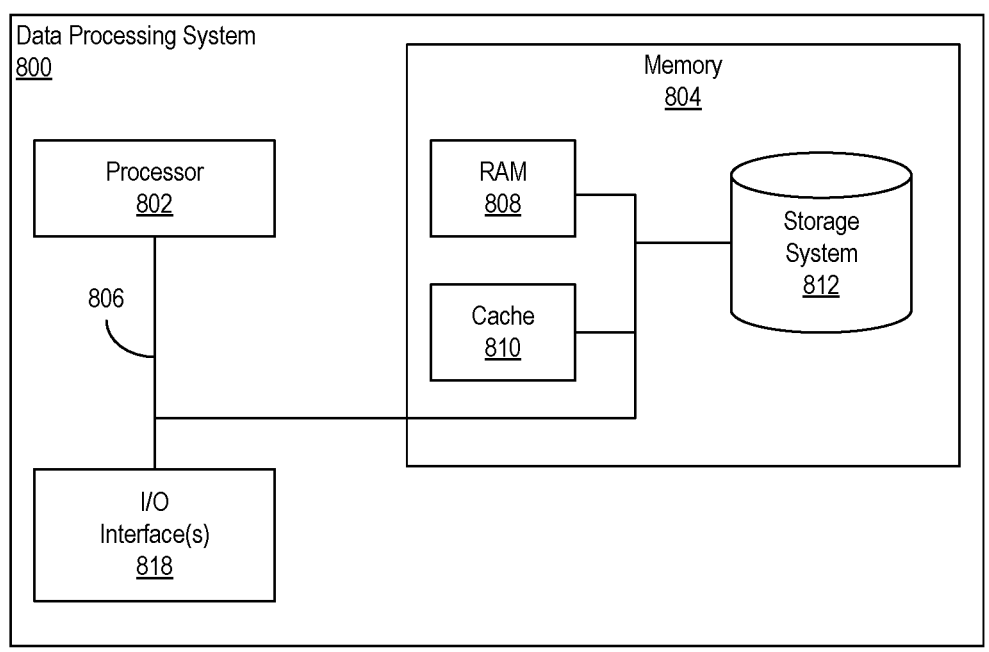
FIG. 8 illustrates an example of a data processing system for use with the inventive arrangements.

FIG. 8 illustrates an example implementation of a data processing system 800 for use with the inventive arrangements described herein. Data processing system 800 may be used to implement the example compiler 100 of FIG. 1 and/or to perform simulation using the resulting simulation kernel as described herein.

As defined herein, the term "data processing system" means one or more hardware systems configured to process data, each hardware system including at least one processor and memory, wherein the processor is programmed with computer-readable instructions that, upon execution, initiate operations. Data processing system 800 can include a processor 802, a memory 804, and a bus 806 that couples various system components including memory 804 to processor 802.

Processor 802 may be implemented as one or more processors. In an example, processor 802 is implemented as a central processing unit (CPU). Processor 802 may be implemented as one or more circuits capable of carrying out instructions contained in program code. The circuit may be an integrated circuit or embedded in an integrated circuit. Processor 802 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 806 represents one or more of any of a variety of communication bus structures. By way of example, and not limitation, bus 806 may be implemented as a Peripheral Component Interconnect Express (PCIe) bus. Data processing system 800 typically includes a variety of computer system readable media. Such media may include computer-readable volatile and non-volatile media and computer-readable removable and non-removable media.

Memory 804 can include computer-readable media in the form of volatile memory, such as random-access memory (RAM) 808 and/or cache memory 810. Data processing system 800 also can include other removable/non-removable, volatile/non-volatile computer storage media. By way of example, storage system 812 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product.

Memory 804 is capable of storing computer-readable program instructions that are executable by processor 802. For example, the computer-readable program instructions can include an operating system, one or more application programs, other program code, and program data. Processor 802, in executing the computer-readable program instructions, is capable of performing the various operations described herein that are attributable to a computer. For example, data processing system 800 may execute a software architecture as described herein in connection with FIGS. 1, 2, 3, 4, 5, and/or 6. It should be appreciated that data items used, generated, and/or operated upon by data processing system 800 are functional data structures that impart functionality when employed by data processing system 800. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 800 may include one or more Input/Output (I/O) interfaces 818 communicatively linked to bus 806. I/O interface(s) 818 allow data processing system 800 to communicate with one or more external devices and/or communicate over one or more networks such as a local area network (LAN), a wide area network (WAN), and/or a public network (e.g., the Internet). Examples of I/O interfaces 818 may include, but are not limited to, network cards, modems, network adapters, hardware controllers, etc. Examples of external devices also may include devices that allow a user to interact with data processing system 800 (e.g., a display, a keyboard, and/or a pointing device) and/or other devices such as accelerator card.

Data processing system 800 is only one example implementation. Data processing system 800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 8 is not intended to suggest any limitation as to the scope of use or functionality of example implementations described herein. Data processing system 800 is an example of computer hardware that is capable of performing the various operations described within this disclosure. In this regard, data processing system 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
    generating, using computer hardware, an intermediate representation of a kernel, wherein the kernel is a high-level synthesis kernel specified in a high-level language;
    detecting, within the intermediate representation of the kernel and using the computer hardware, global address space pointers that reference a global address space, wherein the global address space pointers indicate interactions between the kernel and a component of an electronic system;
    instrumenting, using the computer hardware, the kernel by replacing, within the intermediate representation of the kernel, accesses to the global address space with calls to wrapper functions for performing the accesses; and
    generating a simulation kernel specifying an assembly language version of the kernel as instrumented, wherein the wrapper functions communicate with a model of the component.

2. The method of claim 1, wherein the global address space pointers indicate accesses to a device memory.

3. The method of claim 1, further comprising:
    compiling the simulation kernel into an executable version of the kernel.

4. The method of claim 1, further comprising:
    generating, using the computer hardware, a wrapper for the simulation kernel, wherein the wrapper includes the wrapper functions for performing the accesses.

5. The method of claim 4, wherein the wrapper is a transaction level model wrapper configured to communicate with at least one of one or more register transfer level simulation models or one or more transaction level modeling simulation models.

6. The method of claim 4, wherein the wrapper is a native high-level language wrapper configured to communicate with one or more native high-level language models.

7. The method of claim 1, wherein the detecting the global address space pointers comprises:
    differentiating between the global address space pointers and local address space pointers without determining particular address buffers indicated by each pointer.

8. The method of claim 1, wherein the instrumenting comprises:
    within the intermediate representation of the kernel, replacing load instructions that reference the global address space with read wrapper functions; and within the intermediate representation of the kernel, replacing store instructions that reference the global address space with write wrapper functions.

9. A system, comprising:
one or more processors configured to initiate operations including:
  generating an intermediate representation of a kernel, wherein the kernel is a high-level synthesis kernel specified in a high-level language;
  detecting, within the intermediate representation of the kernel, global address space pointers that reference a global address space, wherein the global address space pointers indicate interactions between the kernel and a component of an electronic system;
  instrumenting the kernel by replacing, within the intermediate representation of the kernel, accesses to the global address space with calls to wrapper functions for performing the accesses; and
  generating a simulation kernel specifying an assembly language version of the kernel as instrumented, wherein the wrapper functions communicate with a model of the component.

10. The system of claim 9, wherein the global address space pointers indicate accesses to a device memory.

11. The system of claim 9, wherein the one or more processors are configured to initiate operations further comprising:
  compiling the simulation kernel into an executable version of the kernel.

12. The system of claim 9, wherein the one or more processors are configured to initiate operations further comprising:
  generating a wrapper for the simulation kernel, wherein the wrapper includes the wrapper functions for performing the accesses.

13. The system of claim 12, wherein the wrapper is a transaction level model wrapper configured to communicate with at least one of one or more register transfer level simulation models or one or more transaction level modeling simulation models.

14. The system of claim 12, wherein the wrapper is a native high-level language wrapper configured to communicate with one or more native high-level language models.

15. The system of claim 9, wherein the detecting the global address space pointers comprises:
  differentiating between the global address space pointers and local address space pointers without determining particular address buffers indicated by each pointer.

16. The system of claim 9, wherein the instrumenting comprises:
  within the intermediate representation of the kernel, replacing load instructions that reference the global address space with read wrapper functions; and
  within the intermediate representation of the kernel, replacing store instructions that reference the global address space with write wrapper functions.

17. A computer program product, comprising:
one or more computer-readable storage media, and program instructions collectively stored on the one or more computer-readable storage media, wherein the program instructions are executable by computer hardware to initiate operations including:
  generating an intermediate representation of a kernel, wherein the kernel is a high-level synthesis kernel specified in a high-level language;
  detecting, within the intermediate representation of the kernel, global address space pointers that reference a global address space, wherein the global address space pointers indicate interactions between the kernel and a component of an electronic system;
  instrumenting the kernel by replacing, within the intermediate representation of the kernel, accesses to the global address space with calls to wrapper functions for performing the accesses; and
  generating a simulation kernel specifying an assembly language version of the kernel as instrumented, wherein the wrapper functions communicate with a model of the component.

18. The computer program product of claim 17, wherein the global address space pointers indicate accesses to a device memory.

19. The computer program product of claim 17, wherein the program instructions are executable by the computer hardware to initiate operations further comprising:
  generating a wrapper for the simulation kernel, wherein the wrapper includes the wrapper functions for performing the accesses.

20. The computer program product of claim 17, wherein the instrumenting comprises:
  within the intermediate representation of the kernel, replacing load instructions that reference the global address space with read wrapper functions; and
  within the intermediate representation of the kernel, replacing store instructions that reference the global address space with write wrapper functions.

\* \* \* \* \*